July 4, 1967 R. WALKER 3,329,434

MAGNETIC TAPE RECORDERS

Filed Oct. 6, 1964 2 Sheets-Sheet 1

INVENTOR.
RONALD WALKER
BY
Kurt Kelman
AGENT.

July 4, 1967 R. WALKER 3,329,434

MAGNETIC TAPE RECORDERS

Filed Oct. 6, 1964 2 Sheets-Sheet 2

INVENTOR.
RONALD WALKER
BY Kurt Kelman
AGENT.

United States Patent Office 3,329,434

Patented July 4, 1967

3,329,434

MAGNETIC TAPE RECORDERS

Ronald Walker, Norton, Stourbridge, England, assignor to BSR Limited, Stafford, England, a British company Filed Oct. 6, 1964, Ser. No. 402,028
Claims priority, application Great Britain, Oct. 10, 1963, 39,919/63
2 Claims. (Cl. 274—4)

This invention relates to sound recording and play-back apparatus utilising magnetic tape and of the type now commonly known as "tape-recorders" wherein the tape is passed from one to another of two rotatable spools and past an assembly of transducer and erasure heads.

In such tape-recorders the tape is drawn past and in contact with, or very close to, the operative faces of "tape heads" each of which comprises an electro-magnet for the recording and reproduction of sound and also for the erasing of previously recorded signals from the tape and the construction of the type of tape head generally in use today is such that it comprises a metal container (or can) of generally box-like form with the operative face embodying the pole faces of the electro-magnet of a generally outwardly convex form and in order to ensure good response and in particular, good low frequency response, it is desirable to have the tape passing in close contact across a portion of the curved surface of this face of the tape head.

In passing through the assembly of tape heads, the tape is being drawn in a generally straight line path and therefore it is necessary to deflect the tape slightly into contact with the curved surface of the tape head and this has involved hitherto the use of some form of pressure pad to lightly press the tape under spring pressure against the convex surface of the tape head.

It is essential that the pressure of the spring means acting upon the tape should be of a certain predetermined value and should remain constant during use of the apparatus because if the pressure is insufficient there will not be the required good contact between the tape and the curved surface of the tape head and if the pressure is too great there will be unwanted frictional resistance set up to interfere with the transport of the tape.

The object of the present invention is to provide an improved arrangement of tape head involving improved means for maintaining the desired pressure upon the tape when in contact with the tape head.

According to the invention there is provided in or for a tape recorder of the type specified, a tape head assembly including a tape head and, in opposition thereto, a pressure pad mounted upon the end of a spindle which is supported slidably in a carrier adapted to be moved towards and away from the tape head, there being a coil spring surrounding the spindle and acting upon the pressure pad to urge it resiliently into engagement with the convex operative face of the tape head.

Preferably the aforesaid spindle is mounted for axial sliding movement in a bush or yoke fixed in the carrier and the pressure pad is mounted upon a plate fixed to the outer end of such spindle, means being provided cooperating with the carrier to prevent rotation of the spindle in its supporting bush or yoke.

One embodiment of the invention is hereinafter described in more detail, by way of example, with reference to the accompanying drawings, and only those parts of the tape-recorder relating to the tape head assembly are hereinafter referred to, as the remaining parts of the tape-recorder may be of any desired construction.

Figure 1:
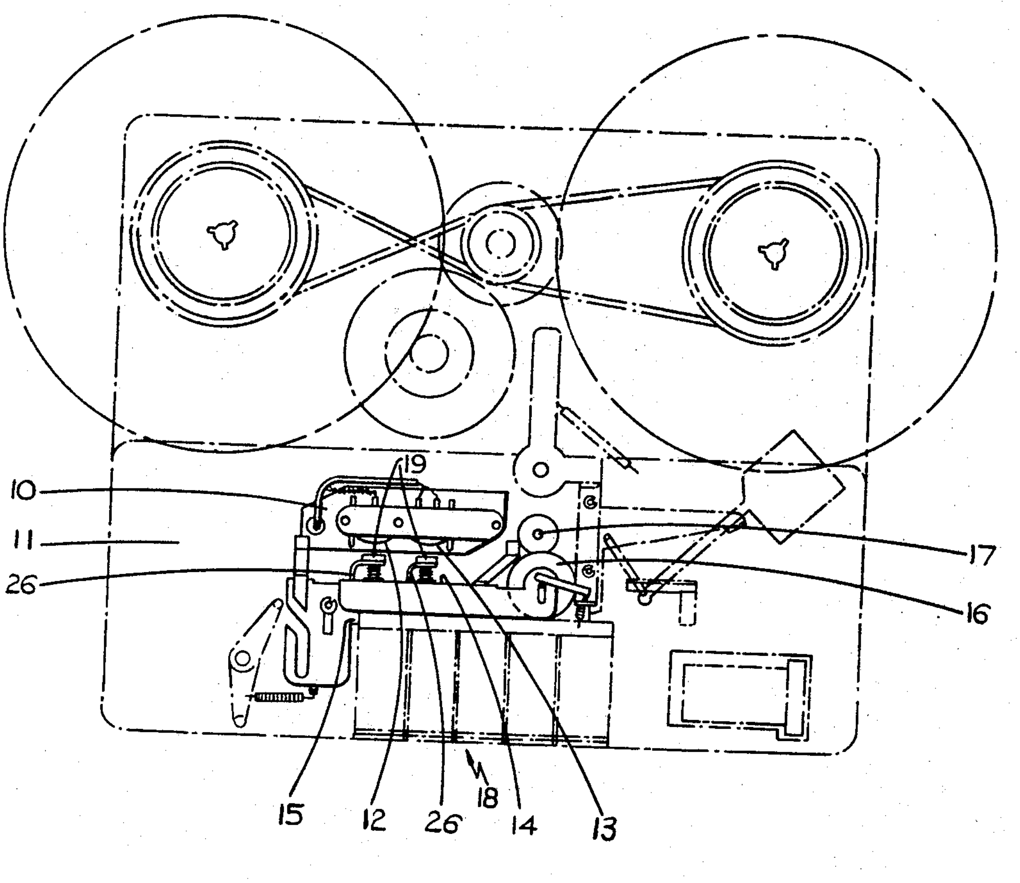
FIGURE 1 is a plan view of a tape-recorder.

In the embodiment shown in the drawings and hereinafter described by way of example, the invention is shown applied to a tape recorder having two tape heads, one being an erasing head, and the other being a recording and reproducing head, each of the same general external configuration and construction and mounted fixedly upon a mounting block 10 which is secured to the upper face of the tape deck 11 so that the two heads are in line and spaced apart in the direction of the transport of the tape.

In FIGURE 1 the erasing head is shown at 12 and the recording and reproducing head at 13. Space is available next to the head 13 if it is desired to use two separate heads for recording and reproducing, so that for some tape recorders the third head can be accommodated.

Opposite the mounting block 10 there is a carrier plate 15 which is mounted upon the tape deck for sliding movement towards and away from the assembly of tape heads and this carrier plate has, at its edge adjacent the tape heads, an upwardly extending flange 14 upon which are mounted the pressure pads as hereinafter described.

The carrier plate 15 also carries at one end thereof the usual form of rubber roller 16 adapted to co-operate with the capstan spindle 17 of the apparatus to draw the tape past the assembly of tape heads and the carrier plate is interconnected to the manual operating mechanism of the tape-recorder (comprising the bank of finger levers 18) so that upon depression of the start finger lever or similar control, the carrier plate 15 is moved in the direction to advance the pressure pads towards the tape heads.

Each pressure pad comprises a pad 19 of felt or similar material secured to the outer face of a plate 20, which may have a slightly concave formation to correspond to the outwardly slightly convex form of the operative face of the tape head, and this plate is fixed to the outer end of a short spindle 21 which, in the case of the pad for the erase head 12, is mounted slidably in a tubular bush 22 secured to the face of the upwardly projecting flange 14 on the carrier plate (see FIGURES 2 and 3), such bush being secured to that face of the flange 14 which is remote from the assembly of tape heads.

Figures 2, 3, 4, 5:
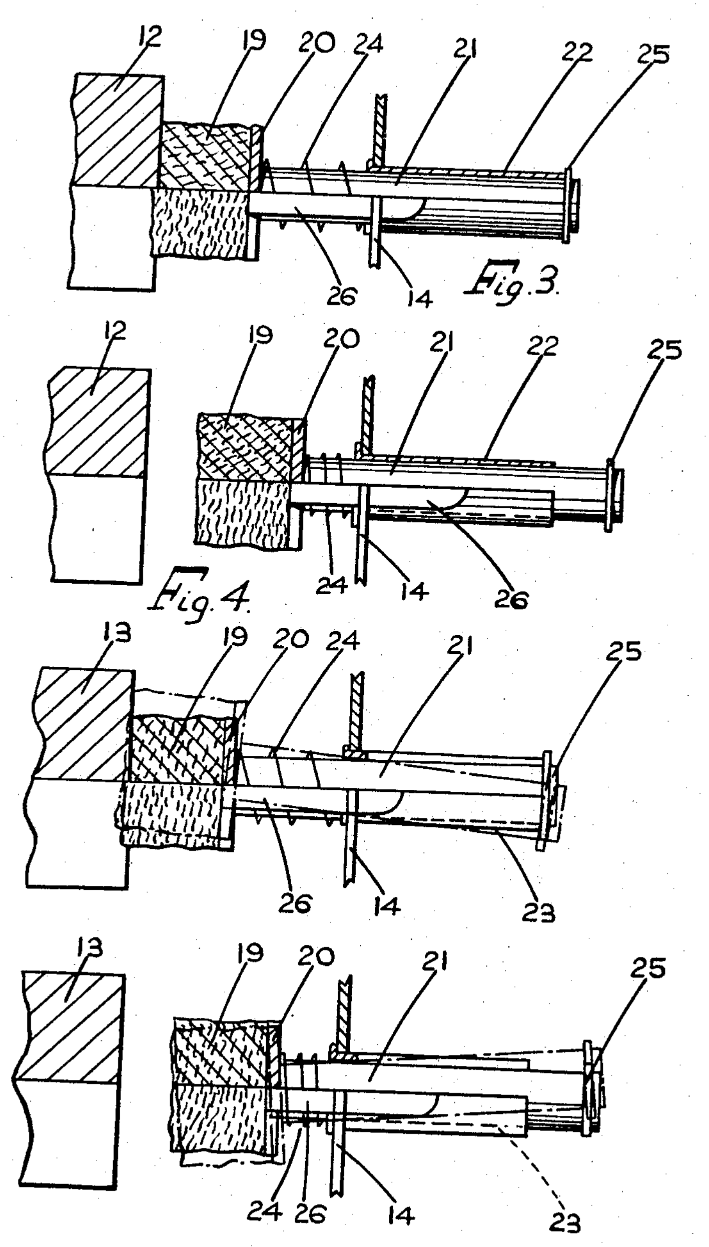
FIGURE 2 is an enlarged view in side elevation partly in section, showing the pressure pad engaging the erase head.
FIGURE 3 is a similar view showing the pad retracted.
FIGURES 4 and 5 are views similar to FIGURES 2 and 3 respectively, showing the pad associated with the record and reproduce head with the vertical tilting of the pad indicated in dotted lines.

In the case of the pad for the record/reproduce head 13 (or both pads if there are two separate heads) the spindle 21 is mounted slidably in a U-shape yoke or channel 23 screwed to the flange 14 so that, although the spindle 21 is prevented from horizontal sideways movement because of engagement with the sides of the yoke 23, it can perform slight tilting movement in the vertical plane, as shown in FIGURES 4 and 5. This is to take account of any discrepancies which may occur in manufacture in the positioning of the block 10 in relation to the sliding plate 15. If there is any vertical misalignment between the central axis of the head 13 and the centre of the pad 19, the pad can adjust itself to conform correctly to the convex face of the head to ensure uniform pressure upon the tape against the head.

In the case of the erase head 12, the mounting of the spindle may be the same as this, if desired, but the question of misalignment here is not so critical as with the recording and reproducing head or heads.

Referring back to both pressure pads, each has a light coil spring 24 disposed about the spindle 21 and operating between the plate 20 on the end of the spindle, at one end, and the outer face of the flange 14 of the carrier plate at the other end so that such spring is tending to urge the spindle outwardly in the direction towards its corresponding tape head.

The end of the spindle 21 remote from the pressure pad is provided with a circlip 25 or like means to limit its outwards movement in its supporting bush or yoke and to prevent rotation of the spindle in this supporting bush or yoke, the plate 20 on the spindle has at one edge a rearwardly projecting leg 26 which passes slidably through a slot or hole in the flange 14 of the carrier plate.

The arrangement above described has the main advantage that the spring pressure acting upon the pressure pad to press the tape into contact with the curved face of the tape head can be accurately controlled in that the coil spring 24 can be manufactured to fairly closely controlled limits to ensure that each coil spring used exerts just the required amount of pressure.

Also the mounting of the spindle which carries the pressure pad in a bush or yoke for axial sliding movement, means that the amount of friction can be reduced to a minimum and thus ensure that the movement of the spindle is always free and under control of its coil spring.

What I claim then is:

1. In a tape recorder having an assembly of tape heads across which a magnetic tape is moved the improvement wherein the assembly of tape heads includes a tape head having an operative surface, a pressure pad to act upon the tape to resiliently urge it against the operative face of the tape head, a spindle on which the pressure pad is carried, a carrier member movable towards and away from the tape head, a U-shaped yoke carried on the carrier member and means for mounting the spindle in said yoke for axial sliding movement of the spindle relative thereto and for limited tilting movement of the spindle in a plane transverse to the direction of travel of the tape and normal to the plane of the tape, a coil spring surrounding the spindle and acting between the pressure pad and the carrier to urge the pad resiliently into engagement with the operative face of the tape head when the carrier is moved towards the tape head.

2. The improvement according to claim 1, wherein a plate is fixed to one end of said spindle, said pressure pad being fixed to said plate, a leg connected to said plate and extending parallel to and spaced from said spindle in side by side relationship therewith, said carrier member having an apertured flange, said yoke being fixed to said flange and said leg extending into said aperture to prevent rotation of said spindle about the longitudinal axis thereof.

References Cited

UNITED STATES PATENTS

| | | | |
|---|---|---|---|
| 2,275,961 | 3/1942 | Heller | 274—4 |
| 2,750,449 | 6/1956 | Thompson et al. | 274—4 X |
| 2,873,318 | 2/1959 | Moore | 179—100.2 |
| 3,157,868 | 11/1964 | Buslik | 179—100.2 |

NORTON ANSHER, *Primary Examiner.*

F. L. BRAUN, *Assistant Examiner.*